(12) United States Patent
Makiuchi

(10) Patent No.: US 10,235,003 B2
(45) Date of Patent: Mar. 19, 2019

(54) TOUCH PANEL DEVICE

(71) Applicant: FUJITSU COMPONENT LIMITED, Tokyo (JP)

(72) Inventor: Yuji Makiuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 99 days.

(21) Appl. No.: 15/091,965

(22) Filed: Apr. 6, 2016

(65) Prior Publication Data
US 2017/0068358 A1 Mar. 9, 2017

(30) Foreign Application Priority Data

Sep. 3, 2015 (JP) .................................. 2015-173838

(51) Int. Cl.
*G06F 3/045* (2006.01)
*G06F 3/041* (2006.01)

(52) U.S. Cl.
CPC ............ *G06F 3/045* (2013.01); *G06F 3/0416* (2013.01); *G06F 2203/04104* (2013.01)

(58) Field of Classification Search
CPC . G06F 3/045; G06F 2203/04104; G06F 3/416
USPC .......................................................... 345/174
See application file for complete search history.

(56) References Cited

U.S. PATENT DOCUMENTS

| 4,933,660 A * | 6/1990 | Wynne, Jr. ............... G01L 1/205 338/114 |
| 2009/0109191 A1 | 4/2009 | Felder et al. |
| 2009/0322701 A1 * | 12/2009 | D'Souza .................. G06F 3/045 345/174 |
| 2010/0283761 A1 * | 11/2010 | Chang ...................... G06F 3/045 345/174 |
| 2011/0134072 A1 * | 6/2011 | Li ............................ G06F 3/045 345/174 |
| 2011/0157083 A1 * | 6/2011 | Hershman ............... G06F 3/045 345/174 |

(Continued)

FOREIGN PATENT DOCUMENTS

| JP | 11-232023 | 8/1999 |
| JP | 2010-241370 | 10/2010 |

(Continued)

OTHER PUBLICATIONS

Japanese Platform for Patent Information, Publication No. 11-232023, published Aug. 27, 1999.

(Continued)

*Primary Examiner* — Yuzhen Shen
(74) *Attorney, Agent, or Firm* — Staas & Halsey LLP

(57) ABSTRACT

A touch panel device including: a first resistance film; a second resistance film opposed to the first resistance film; a pair of first electrodes that is arranged on the first resistance film, and applies a first voltage to the first resistance film; a pair of second electrodes that is arranged on both ends of the second resistance film in the same direction as an application direction of the first voltage; a first detector that is connected to the pair of the second electrodes, and detects voltages at the second electrodes, respectively; and a calculator that calculates coordinates of two points in the application direction of the first voltage based on the respective voltages detected by the first detector.

7 Claims, 12 Drawing Sheets

(56) References Cited

U.S. PATENT DOCUMENTS

| | | | |
|---|---|---|---|
| 2012/0019477 A1 | 1/2012 | Fujita et al. | |
| 2012/0154325 A1* | 6/2012 | Ueno | G06F 3/0416 |
| | | | 345/174 |
| 2014/0232689 A1* | 8/2014 | Fujita | G06F 3/045 |
| | | | 345/174 |

FOREIGN PATENT DOCUMENTS

| | | |
|---|---|---|
| JP | 2011-502314 | 1/2011 |
| JP | 2012-94003 | 5/2012 |
| JP | 2014-34476 | 2/2014 |

OTHER PUBLICATIONS

Japanese Platform for Patent Information, Publication No. 2012-94003, published May 17, 2012.
Japanese Platform for Patent Information, Publication No. 2010-241370, published Oct. 28, 2010.
Japanese Platform for Patent Information, Publication No. 2014-34476, published Feb. 24, 2014.

* cited by examiner

FIG. 4

|  | SW106 | SW108 | SW126 | SW127 | ADC111 | ADC112 | ADC113 | ADC114 |
|---|---|---|---|---|---|---|---|---|
| X-DIRECTION | OFF | OFF | ON | ON | USE | USE | UNUSED | UNUSED |

FIG. 6

| | SW106 | SW108 | SW126 | SW127 | ADC111 | ADC112 | ADC113 | ADC114 |
|---|---|---|---|---|---|---|---|---|
| Y-DIRECTION | ON | ON | OFF | OFF | UNUSED | UNUSED | USE | USE |

FIG. 10

| | SW226 | SW227 | SW228 | SW229 | SW230 | SW231 | ADC211 | ADC212 | ADC213 | ADC214 |
|---|---|---|---|---|---|---|---|---|---|---|
| X-DIRECTION | ON | ON | OFF | OFF | ON | ON | USE | USE | UNUSED | UNUSED |

FIG. 12

| | SW226 | SW227 | SW228 | SW229 | SW230 | SW231 | ADC211 | ADC212 | ADC213 | ADC214 |
|---|---|---|---|---|---|---|---|---|---|---|
| Y-DIRECTION | ON | OFF | ON | ON | OFF | ON | UNUSED | UNUSED | USE | USE |

TOUCH PANEL DEVICE

CROSS-REFERENCE TO RELATED APPLICATION

This application is based upon and claims the benefit of priority of the prior Japanese Patent Application No. 2015-173838 filed on Sep. 3, 2015, the entire contents of which are incorporated herein by reference.

FIELD

A certain aspect of the embodiments is related to a touch panel device.

BACKGROUND

There has been known a resistance film type touch panel that detects two simultaneous touch inputs (e.g. see Japanese Laid-open Patent Publication Nos. 11-232023 and 2011-502314). Moreover, there has been known a four-wire type and resistance film type touch panel that detects two simultaneous touch inputs (e.g. see Japanese Laid-open Patent Publication No. 2012-94003).

SUMMARY

According to an aspect of the present invention, there is provided a touch panel device including: a first resistance film; a second resistance film opposed to the first resistance film; a pair of first electrodes that is arranged on the first resistance film, and applies a first voltage to the first resistance film; a pair of second electrodes that is arranged on both ends of the second resistance film in the same direction as an application direction of the first voltage; a first detector that is connected to the pair of the second electrodes, and detects voltages at the second electrodes, respectively; and a calculator that calculates coordinates of two points in the application direction of the first voltage based on the respective voltages detected by the first detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an ON/OFF state of each switch and a use/unused state of each AD converter at the time of the detection of at least one input coordinate in the X-direction;

FIG. 6 is a diagram illustrating an ON/OFF state of each switch and a use/unused state of each AD converter at the time of the detection of at least one input coordinate in the Y-direction;

FIG. 10 is a diagram illustrating an ON/OFF state of each switch and a use/unused state of each AD converter at the time of the detection of at least one input coordinate in the X-direction;

FIG. 12 is a diagram illustrating an ON/OFF state of each switch and a use/unused state of each AD converter at the time of the detection of at least one input coordinate in the Y-direction.

DESCRIPTION OF EMBODIMENTS

A conventional touch panel system requires an exclusive panel drive circuit for detecting an intermediate point between two touched points and another exclusive panel drive circuit for detecting positions of the two touched points. The switching of the panel drive circuit is needed in order to detect an X-coordinate of a single touched point, and the switching of the panel drive circuit is further needed in order to detect a Y-coordinate of the single touched point. For this reason, in order to detect positions of the two touched points, the switching of the panel drive circuit is needed four times in total. Moreover, a time period for measuring the position of the intermediate point between the two touched points and a time period for measuring a distance between the two touched points are needed individually. That is, the conventional touch panel system cannot measure X-coordinates and Y-coordinates of the two touched points at a time.

A description will now be given of an embodiment according to the present invention with reference to drawings.

First Embodiment

Figure 1:
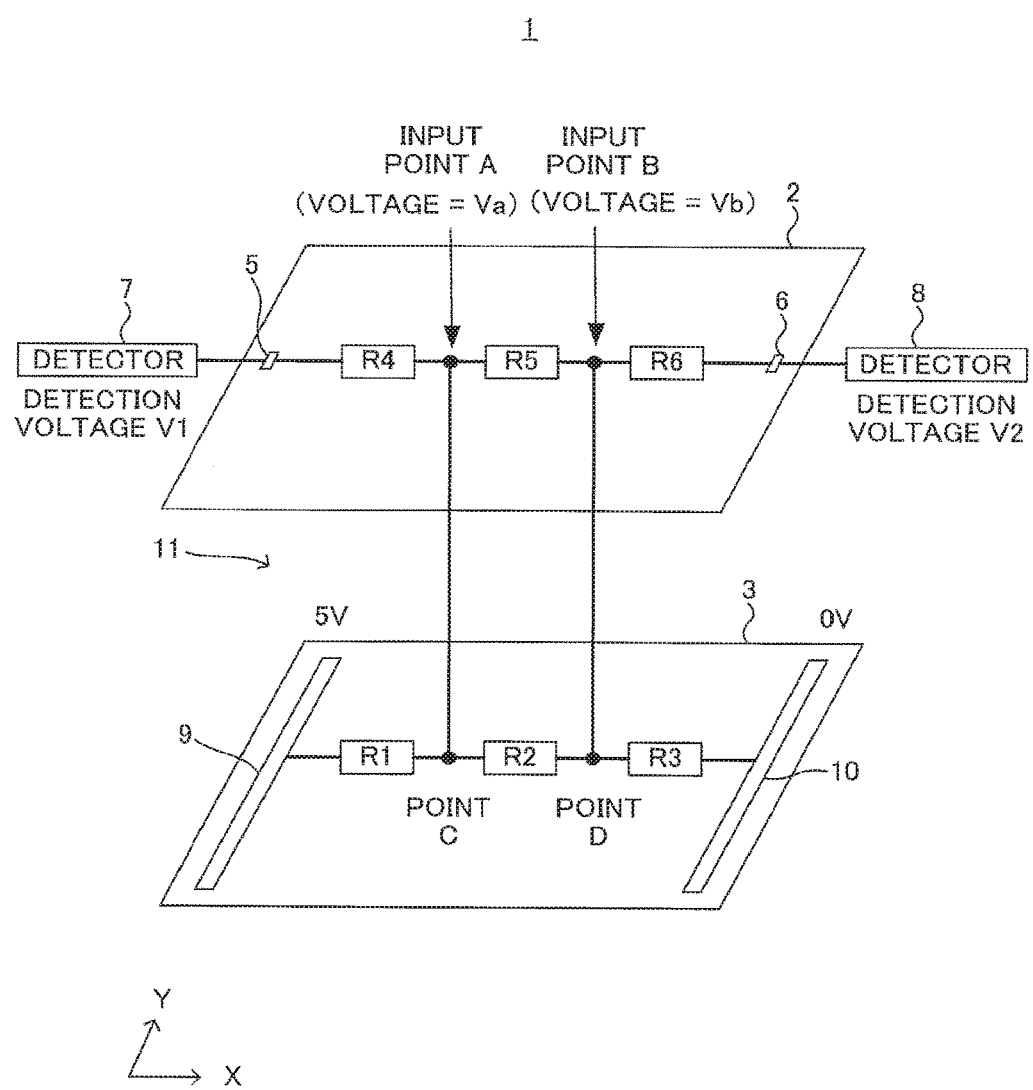
FIG. 1 is a diagram illustrating a detection principle of voltages when two points are input in a touch panel device according to a first embodiment.

FIG. 1 is a diagram illustrating a detection principle of voltages when two points are input in a touch panel device according to a first embodiment.

A touch panel device 1 of FIG. 1 is a resistance film type touch panel, and is provided with an upper transparent conductive film 2 and a lower transparent conductive film 3 which have the same area as each other. An air gap 11 is formed between the upper transparent conductive film 2 and the lower transparent conductive film 3. When a user depresses two points (e.g. an input point A and an input point B) on the upper transparent conductive film 2, the two points contact another two points (e.g. a point C and a point D) on the lower transparent conductive film 3, respectively.

The upper transparent conductive film 2 includes contact electrodes 5 and 6 for detecting voltages. The contact electrodes 5 and 6 on the upper transparent conductive film 2 which detect the voltages are arranged on both ends of the upper transparent conductive film 2 in the same direction as a voltage application direction (i.e., a direction from an electrode 9 to an electrode 10 or an X-direction). A shape of each of the contact electrodes 5 and 6 is not limited to a point shape, and may be a rod shape. A detector 7 for detecting a voltage of the contact electrode 5 is connected to the contact electrode 5. A detector 8 for detecting a voltage of the contact electrode 6 is connected to the contact electrode 6. FIG. 1 illustrates a resistance on the upper transparent conductive film 2 between the contact electrode 5 and the input point A as a resistance R4, a resistance on the upper transparent conductive film 2 between the input point A and the input point B as a resistance R5, and a resistance on the upper transparent conductive film 2 between the input point B and the contact electrode 6 as a resistance R6.

The lower transparent conductive film 3 includes electrodes 9 and 10 for applying voltages. A shape of each of the electrodes 9 and 10 is not limited to a rod shape, and may be a point shape. FIG. 1 illustrates a resistance on the lower transparent conductive film 3 between the electrode 9 and the point C as a resistance R1, a resistance on the lower transparent conductive film 3 between the point C and the point D as a resistance R2, and a resistance on the lower transparent conductive film 3 between the point D and the electrode 10 as a resistance R3.

Here, it is assumed that a voltage of 5V is applied to the electrode 9, and the electrode 10 is connected to a ground (0V). When the two points (e.g. the input points A and B) on the upper transparent conductive film 2 contact another two points (e.g. the input points C and D) on the lower transparent conductive film 3, the voltage of the input point A is expressed by "Va" and the voltage of the input point B is expressed by "Vb". Moreover, a detection voltage of the detector 7 is expressed by "V1" and a detection voltage of the detector 8 is expressed by "V2".

The voltage Va of the input point A is expressed by a formula (1).

$$\text{Voltage } Va = 5 \times (R2+R3)/(R1+R2+R3) \quad (1)$$

The voltage Vb of the input point B is expressed by a formula (2).

$$\text{Voltage } Vb = 5 \times (R3)/(R1+R2+R3) \quad (2)$$

When the detectors 7 and 8 arranged in respective different directions detect output voltages based on the voltages Va and Vb of the two different input points A and B, detection voltages V1 and V2 is calculated according to formulas (3) and (4) by Millman's theorem, respectively.

$$\text{Detection Voltage } V1 = \{Va \times 1/R4 + Vb \times 1/(R4+R5)\}/\{1/R4 + 1/(R4+R5)\} \quad (3)$$

$$\text{Detection Voltage } V2 = \{Va \times 1/(R5+R6) + Vb \times 1/R6\}/\{1/(R5+R6) + 1/R6\} \quad (4)$$

Moreover, following information (i) and (ii) are obtained by using the detection voltages V1 and V2.

(i) An absolute value (|V1−V2|) of a difference between the detection voltages V1 and V2 is proportional to a distance between the input points A and B. More specifically, the absolute value (|V1−V2|) of the difference between the detection voltages V1 and V2 is obtained by multiplying a ratio of a potential difference between the electrodes 9 and 10 to the distance between the electrodes 9 and 10 by a distance between the input points A and B. That is, information (i) is expressed by a formula (5), and the distance between the input points A and B is expressed by a formula (6).

$$|V1-V2| = \frac{\text{Potential difference between electrodes 9 and 10}}{\text{Distance between electrodes 9 and 10}} \times \text{Distance between input points } A \text{ and } B \quad (5)$$

$$\text{Distance between input points } A \text{ and } B = \frac{\text{Distance between electrodes 9 and 10}}{\text{Potential difference between electrodes 9 and 10}} \times |V1-V2| \quad (6)$$

(ii) An average value of the detection voltages V1 and V2 indicates an intermediate potential between the input points A and B. Therefore, an intermediate coordinate between the input points A and B is calculated by multiplying a ratio of an average value of the detection voltages V1 and V2 to the potential difference between the electrodes 9 and 10 by the distance between the electrodes 9 and 10. That is, the intermediate coordinate between the input points A and B is expressed by a formula (7).

$$\text{Intermediate coordinate between input points } A \text{ and } B = \frac{\text{Average value of detection voltages } V1 \text{ and } V2}{\text{Potential difference between electrodes 9 and 10}} \times \text{Distance between electrodes 9 and 10} \quad (7)$$

Therefore, the coordinates of the input points A and B are calculated by adding and reducing a half of the distance calculated with the formula (6) to/from the intermediate coordinate calculated with the formula (7).

Figure 2:
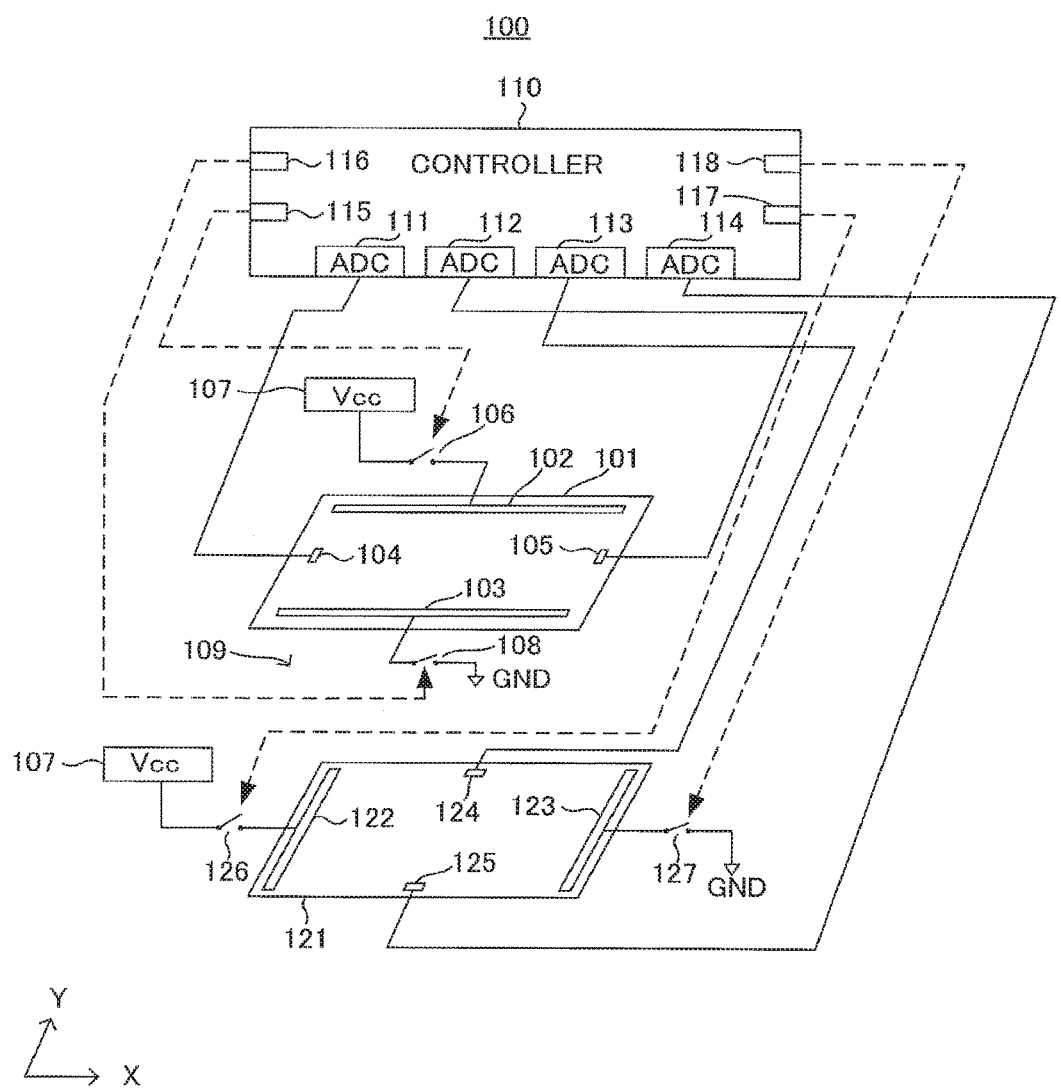
FIG. 2 is a diagram illustrating a configuration of the touch panel device according to the first embodiment.

FIG. 2 is a diagram illustrating a configuration of the touch panel device according to the first embodiment.

In a touch panel 100 of FIG. 2, a plurality of electrodes for measuring voltages from the same directions as voltage application directions are added to an existing four-wire type and resistance film type touch panel.

The touch panel device 100 includes an upper transparent conductive film 101, a lower transparent conductive film 121, and a controller 110. The upper transparent conductive film 101 and the lower transparent conductive film 121 have the same area as each other, and an air gap 109 is formed therebetween. When the user depresses the upper transparent conductive film 101, the upper transparent conductive film 101 contacts the lower transparent conductive film 121.

The upper transparent conductive film 101 includes rod-shaped electrodes 102 and 103 for applying voltages, and contact electrodes 104 and 105 for detecting voltage. The rod-shaped electrodes 102 and 103 extend in the X-direction, and are arranged on both ends parallel to the X-direction of the upper transparent conductive film 101, respectively. The contact electrodes 104 and 105 are arranged on right and left ends of the upper transparent conductive film 101 (specifically, centers of both ends parallel to the Y-direction of the upper transparent conductive film 101), respectively.

That is, the contact electrodes 104 and 105 other than the rod-shaped electrodes 102 and 103 included in an existing upper transparent conductive film are newly added to the upper transparent conductive film 101. Here, it is preferable that the electrodes to be newly added are contact electrodes (i.e., the contact electrodes 104 and 105) so as not to affect an equipotential distribution to be formed between the rod-shaped electrodes 102 and 103.

One end of a switch 106 is connected to the rod-shaped electrode 102, and the other end of the switch 106 is connected to a power supply voltage (Vcc) 107. One end of a switch 108 is connected to the rod-shaped electrode 103, and the other end of the switch 108 is connected to a ground (GND). For example, the power supply voltage (Vcc) 107 is 5V.

The lower transparent conductive film 121 includes rod-shaped electrodes 122 and 123 for applying voltages, and contact electrodes 124 and 125 for detecting voltage. The rod-shaped electrodes 122 and 123 extend in the Y-direction, and are arranged on both ends parallel to the Y-direction of the lower transparent conductive film 121, respectively. The contact electrodes 124 and 125 are arranged on centers of both ends parallel to the X-direction of the lower transparent conductive film 121, respectively.

That is, the contact electrodes 124 and 125 other than the rod-shaped electrodes 122 and 123 included in an existing lower transparent conductive film are newly added to the lower transparent conductive film 121. Here, it is preferable that the electrodes to be newly added are contact electrodes (i.e., the contact electrodes 124 and 125) so as not to affect an equipotential distribution to be formed between the rod-shaped electrodes 122 and 123.

One end of a switch 126 is connected to the rod-shaped electrode 122, and the other end of the switch 126 is connected to the power supply voltage (Vcc) 107. One end of a switch 127 is connected to the rod-shaped electrode 123, and the other end of the switch 127 is connected to a ground (GND).

The controller 110 includes AD converters 111 to 114, and control terminals 115 to 118 that output on/off signals for turning on/off the switches 106, 108, 126 and 127. The AD converters 111 to 114 are connected to the contact electrodes 104, 105, 124 and 125, respectively. The control terminals 115 to 118 are connected to the switches 106, 108, 126 and 127, respectively. Each of the switches 106, 108, 126 and 127 is a transistor, for example.

One of the upper transparent conductive film 101 and the lower transparent conductive film 121 functions as a first resistance film, and the other functions as a second resistance film. When the upper transparent conductive film 101 functions as the first resistance film, the rod-shaped electrodes 102 and 103 function as first electrodes, the contact electrodes 124 and 125 function as second electrodes, and the AD converters 113 and 114 function as a first detector. Moreover, when the upper transparent conductive film 101 functions as the first resistance film, the rod-shaped electrodes 122 and 123 function as third electrodes, the contact electrodes 104 and 105 function as fourth electrodes, and the AD converters 111 and 112 function as a second detector.

When the lower transparent conductive film 121 functions as the first resistance film, the rod-shaped electrodes 122 and 123 function as the first electrodes, the contact electrodes 104 and 105 function as the second electrodes, and the AD converters 111 and 112 function as the first detector. When the lower transparent conductive film 121 functions as the first resistance film, the rod-shaped electrodes 102 and 103 function as the third electrodes, the contact electrodes 124 and 125 function as the fourth electrodes, and the AD converters 113 and 114 function as the second detector. The controller 110 functions as a calculator.

Figure 3:
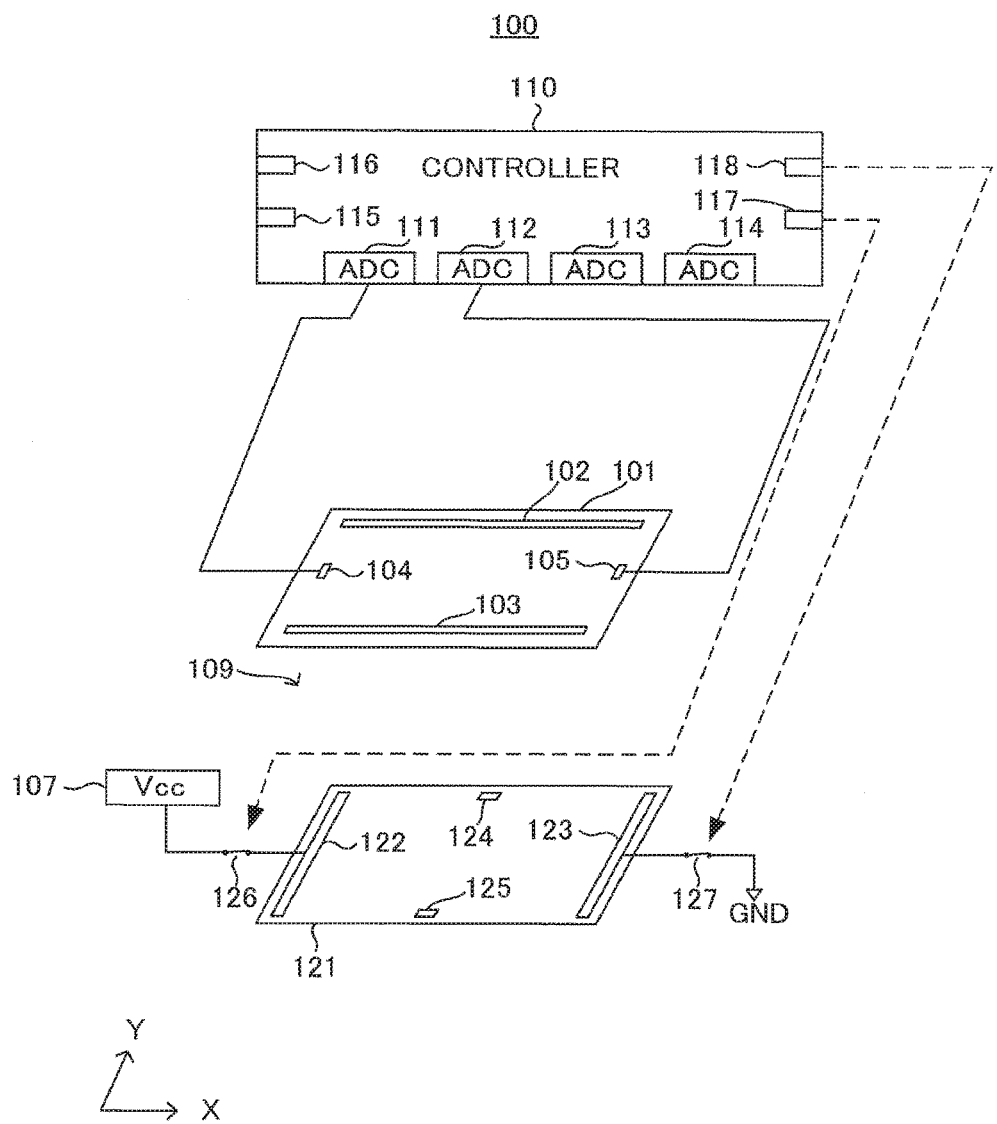
FIG. 3 is a diagram illustrating a circuit state of the touch panel device at the time of the detection of at least one input coordinate in an X-direction.

FIG. 3 is a diagram illustrating a circuit state of the touch panel device at the time of the detection of at least one input coordinate in the X-direction. FIG. 4 is a diagram illustrating an ON/OFF state of each switch and a use/unused state of each AD converter at the time of the detection of at least one input coordinate in the X-direction.

At the time of the detection of at least one input coordinate in the X-direction, the controller 110 controls the control terminals 115 and 116 to output the off signals and turn off the switches 106 and 108. The controller 110 controls the control terminals 117 and 118 to output the on signals and turn on the switches 126 and 127. Moreover, the controller 110 sets the AD converters 111 and 112 into a use state, and sets the AD converters 113 and 114 into an unused state. Thereby, an electric potential distribution is formed in the X-direction of the lower transparent conductive film 121, and hence the AD converters 111 and 112 connected to the contact electrodes 104 and 105 on the upper transparent conductive film 101 acquire at least one voltage corresponding to at least one input position.

In the case of one-point touch, the detection voltages of the AD converters 111 and 112 are equal to each other. Therefore, the controller 110 calculates an input coordinate in the X-direction by multiplying a ratio of the detection voltage to a potential difference between the rod-shaped electrodes 122 and 123 by a distance between the rod-shaped electrodes 122 and 123. That is, the input coordinate in the X-direction is expressed by a formula (8). At this time, the potential difference and the distance between the rod-shaped electrodes 122 and 123 are set to the controller 110 beforehand.

$$X \text{ coordinate (Distance from electrode 123)} = \frac{\text{Detection voltage}}{\text{Potential difference between electrodes 122 and 123}} \times \text{Distance between electrodes 122 and 123} \qquad (8)$$

In the case of two-point touch (i.e., in the case where the input positions are two points separated from each other in the X-direction), the detection voltage of the AD converter 111 is larger than that of the AD converter 112. At this time, the controller 110 calculates a distance between two input positions in the X-direction, based on the above-mentioned formula (6), the detection voltage of the AD converter 111 and the detection voltage of the AD converter 112. Moreover, the controller 110 calculates an intermediate coordinate of the two input positions in the X-direction, based on the above-mentioned formula (7), the detection voltage of the AD converter 111 and the detection voltage of the AD converter 112. In this case, the electrodes 9 and 10 of the formulas (6) and (7) correspond to the electrodes 122 and 123, and the input points A and B correspond to the two input positions. Then, the controller 110 calculates coordinates of the two input positions in the X-direction by adding and reducing a half of the distance calculated with the formula (6) to/from the intermediate coordinate calculated with the formula (7).

Figure 5:
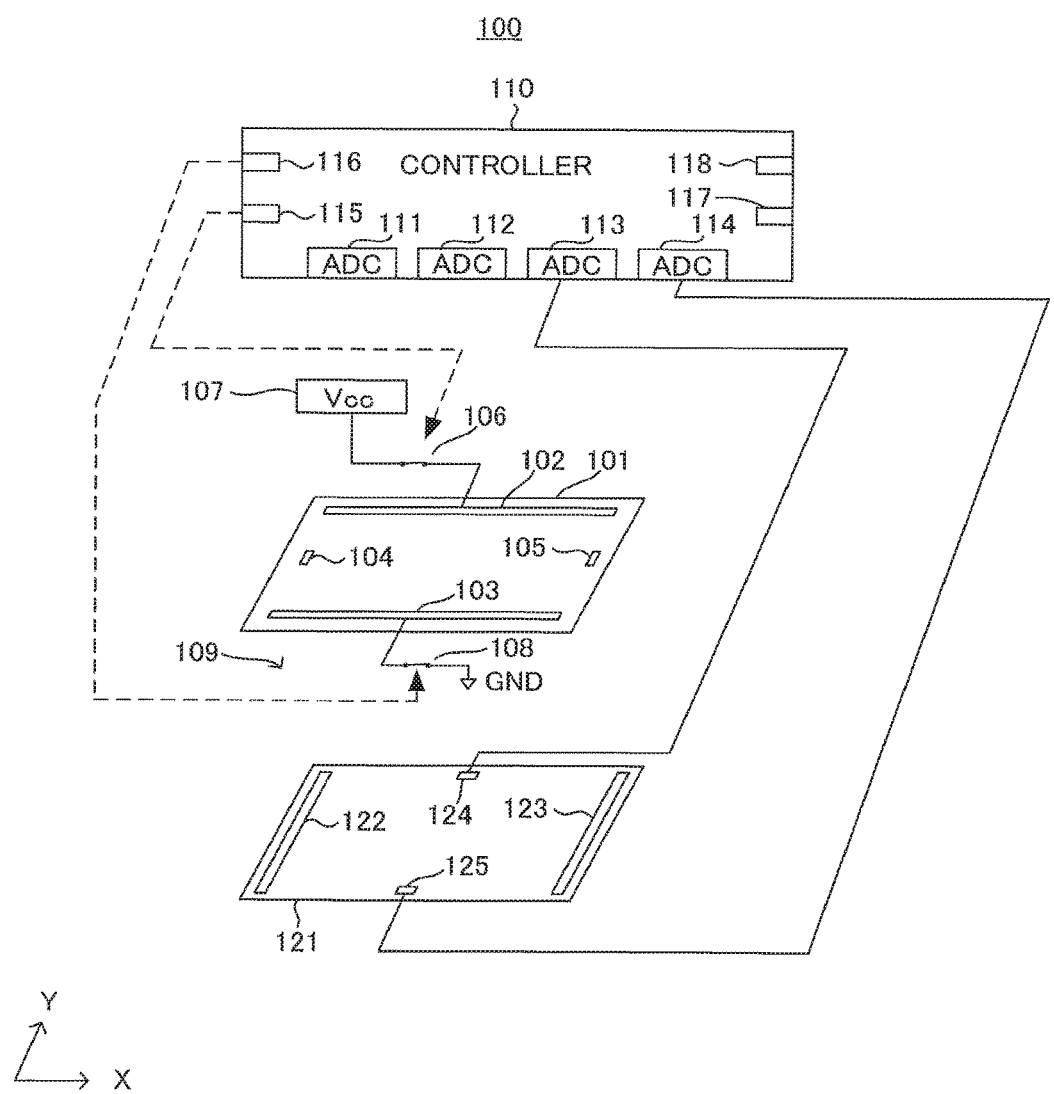
FIG. 5 is a diagram illustrating a circuit state of the touch panel device at the time of the detection of at least one input coordinate in a Y-direction.

FIG. 5 is a diagram illustrating a circuit state of the touch panel device at the time of the detection of at least one input coordinate in the Y-direction. FIG. 6 is a diagram illustrating an ON/OFF state of each switch and a use/unused state of each AD converter at the time of the detection of at least one input coordinate in the Y-direction.

At the time of the detection of at least one input coordinate in the Y-direction, the controller 110 controls the control terminals 115 and 116 to output the on signals and turn on the switches 106 and 108. The controller 110 controls the control terminals 117 and 118 to output the off signals and turn off the switches 126 and 127. Moreover, the controller 110 sets the AD converters 111 and 112 into the unused state, and sets the AD converters 113 and 114 into the used state. Thereby, an electric potential distribution is formed in the Y-direction of the upper transparent conductive film 101, and hence the AD converters 113 and 114 connected to the contact electrodes 124 and 125 on the lower transparent conductive film 121 acquire at least one voltage corresponding to at least one input position.

In the case of one-point input, the detection voltages of the AD converters 113 and 114 are equal to each other. Therefore, the controller 110 calculates an input coordinate in the Y-direction by multiplying a ratio of the detection voltage to a potential difference between the rod-shaped electrodes 102 and 103 by a distance between the rod-shaped electrodes 102 and 103. That is, the input coordinate in the Y-direction is expressed by a formula (9). At this time, the potential difference and the distance between the rod-shaped electrodes 102 and 103 are set to the controller 110 beforehand.

$$Y \text{ coordinate (Distance from electrode 103)} = \frac{\text{Detection voltage}}{\text{Potential difference between electrodes 102 and 103}} \times \text{Distance between electrodes 102 and 103} \quad (9)$$

In the case of two-point input (i.e., in the case where the input positions are two points separated from each other in the Y-direction), the detection voltage of the AD converter 113 is larger than that of the AD converter 114. At this time, the controller 110 calculates a distance between two input positions in the Y-direction, based on the above-mentioned formula (6), the detection voltage of the AD converter 113 and the detection voltage of the AD converter 114. Moreover, the controller 110 calculates an intermediate coordinate of the two input positions in the Y-direction, based on the above-mentioned formula (7), the detection voltage of the AD converter 113 and the detection voltage of the AD converter 114. In this case, the electrodes 9 and 10 of the formulas (6) and (7) correspond to the rod-shaped electrodes 102 and 103, and the input points A and B correspond to the two input positions. Then, the controller 110 calculates coordinates of the two input positions in the Y-direction by adding and reducing a half of the distance calculated with the formula (6) to/from the intermediate coordinate calculated with the formula (7).

As described above, according to the first embodiment, the touch panel device 100 includes: a pair of rod-shaped electrodes 122 and 123 that is arranged on the lower transparent conductive film 121, and applies a voltage to the lower transparent conductive film 121; a pair of contact electrodes 104 and 105 that is arranged on both ends of the upper transparent conductive film 101 in the same direction as the voltage application direction (e.g. the X-direction); the AD converters 111 and 112 that detect voltages applied to the contact electrodes 104 and 105, respectively, when the upper transparent conductive film 101 contacts the lower transparent conductive film 121 at two points; and the controller 110 that calculates coordinates of the two points in the voltage application direction based on the respective voltages detected by the AD converters 111 and 112. Alternatively, the touch panel device 100 includes: a pair of rod-shaped electrodes 102 and 103 that is arranged on the upper transparent conductive film 101, and applies a voltage to the upper transparent conductive film 101; a pair of contact electrodes 124 and 125 that is arranged on both ends of the lower transparent conductive film 121 in the same direction as the voltage application direction (e.g. the Y-direction); the AD converters 113 and 114 that detect voltages applied to the contact electrodes 124 and 125, respectively, when the upper transparent conductive film 101 contacts the lower transparent conductive film 121 at two points; and the controller 110 that calculates coordinates of the two points in the voltage application direction based on the respective voltages detected by the AD converters 113 and 114.

Therefore, the touch panel device 100 can measure X-coordinates and Y-coordinates of the two touched points at a time. According to the present embodiment, the X-coordinates of the two points are measured at a time, and then the voltage application direction is switched from the X-direction to the Y-direction. Thereby, the Y-coordinates of the two points can be measured at a time. Alternatively, the Y-coordinates of the two points are measured at a time, and then the voltage application direction is switched from the Y-direction to the X-direction. Thereby, the X-coordinates of the two points can be measured at a time. Therefore, it is possible to reduce a measuring time of the coordinates of the two points, compared with a conventional touch panel device. Moreover, the touch panel device 100 does not have to separately include a panel driving circuit for detecting an intermediate point between the two touched points, and a panel driving circuit for detecting the positions of the two touched points. Therefore, it is possible to simplify a panel driving circuit (i.e., the switches 106, 108, 126 and 127 and the control terminals 115 to 118 for switching the voltage application direction), compared with the conventional touch panel device.

Second Embodiment

Figure 7A:
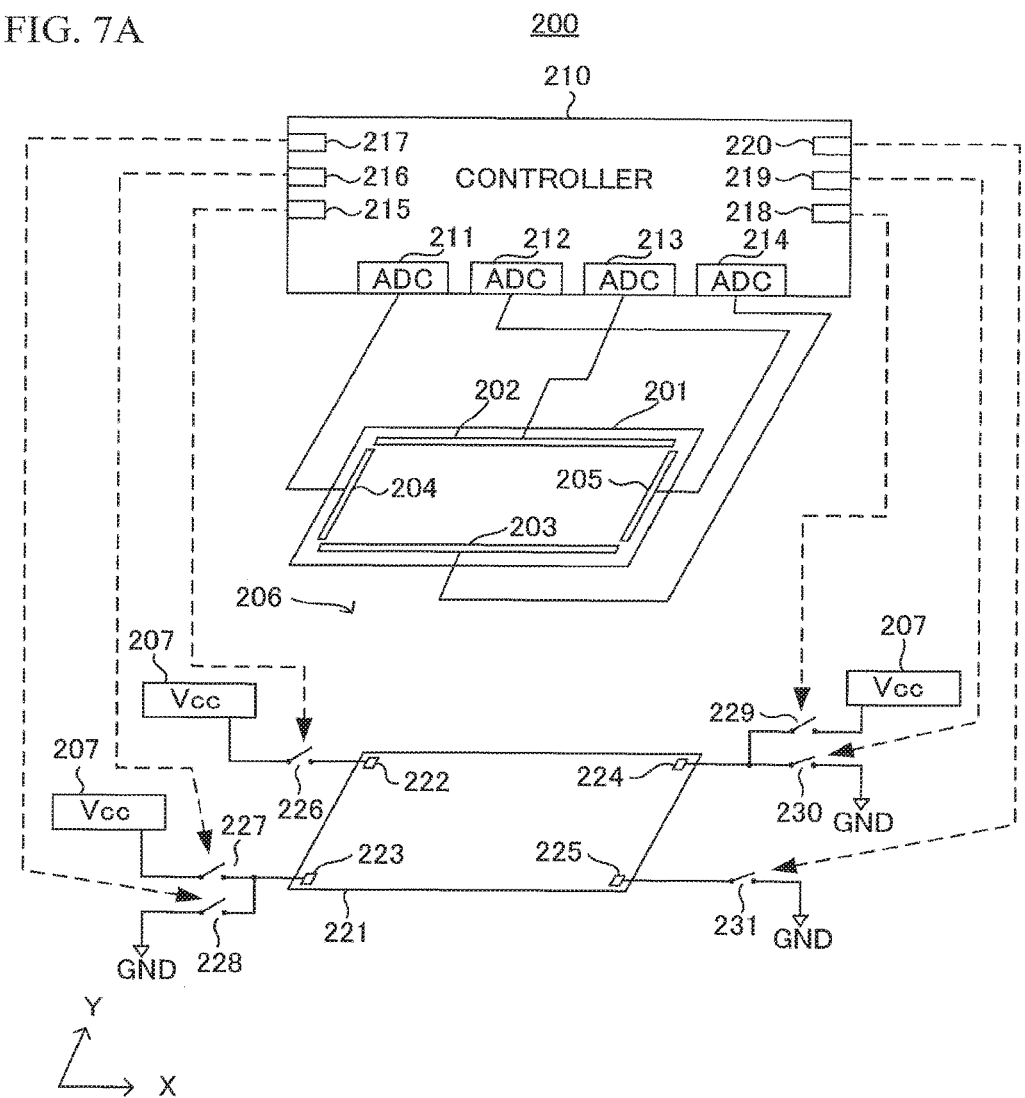
FIG. 7A is a diagram illustrating a configuration of the touch panel device according to a second embodiment.
Figure 7B:
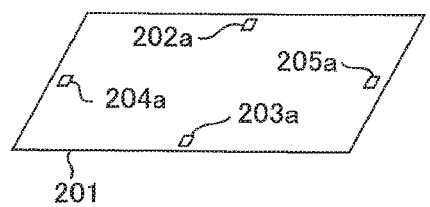
FIG. 7B is a diagram illustrating a variation example of voltage detection electrodes.

FIG. 7A is a diagram illustrating a configuration of the touch panel device according to a second embodiment. FIG. 7B is a diagram illustrating a variation example of voltage detection electrodes.

In a touch panel device 200 of FIG. 7A, a plurality of electrodes for measuring voltages from the same directions as voltage application directions are added to an existing five-wire type and resistance film type touch panel. Here, a seven-wire type touch panel may be used as the touch panel.

The touch panel device 200 includes an upper transparent conductive film 201, a lower transparent conductive film 221 and a controller 210. The upper transparent conductive film 201 and the lower transparent conductive film 221 have the same area as each other, and an air gap 206 is formed therebetween. When the user depresses the upper transparent conductive film 201, the upper transparent conductive film 201 contacts the lower transparent conductive film 221.

The upper transparent conductive film 201 includes rod-shaped electrodes 202 to 205 for applying voltages. The rod-shaped electrodes 202 and 203 extend in the X-direction, and are arranged on both ends parallel to the X-direction of the upper transparent conductive film 201, respectively. The rod-shaped electrodes 204 and 205 extend in the Y-direction, and are arranged on both ends parallel to the Y-direction of the upper transparent conductive film 201, respectively.

That is, in the upper transparent conductive film 201, new three electrodes are added to a single electrode included in the existing upper transparent conductive film. Here, in the five-wire type touch panel, the upper transparent conductive film 201 is used only for detection of the voltages, and therefore irregularities in the electric potential distribution by the additional electrodes do not have to be considered unlike the four-wire type touch panel of FIG. 2. For this reason, the contact electrodes or the rod-shaped electrodes are arbitrarily arranged on four positions in the same directions as the voltage application directions. In an example of FIG. 7A, the upper transparent conductive film 201 includes the four rod-shaped electrodes 202 to 205, but the upper transparent conductive film 201 may include four contact electrodes 202a to 205a, as illustrated in FIG. 7B. In FIG. 7B, the contact electrodes 202a and 203a are arranged on the centers of both ends parallel to the X-direction of the upper transparent conductive film 201, respectively. The contact electrodes 204a and 205a are arranged on the centers of both ends parallel to the Y-direction of the upper transparent conductive film 201, respectively.

The lower transparent conductive film 221 includes contact electrodes 222 to 225 for applying voltages. The contact electrodes 222 to 225 are arranged on four corners of the lower transparent conductive film 221. One end of a switch 226 is connected to the contact electrode 222, and the other end of the switch 226 is connected to a power supply voltage (Vcc) 207. One ends of switches 227 and 228 are connected to the contact electrode 223. The other end of the switch 227 is connected to the power supply voltage (Vcc) 207. The other end of the switch 228 is connected to a ground (GND). One ends of switches 229 and 230 are connected to the contact electrode 224. The other end of the switch 229 is connected to the power supply voltage (Vcc) 207. The other end of the switch 230 is connected to the ground (GND). One end of a switch 231 is connected to the contact electrode 225. The other end of the switch 231 is connected to the ground (GND). For example, the power supply voltage (Vcc) 207 is 5V.

The controller 210 includes AD converters 211 to 214, and control terminals 215 to 220 that output on/off signals for turning on/off the switches 226 to 231. In FIG. 7A, the AD converters 211 to 214 are connected to the rod-shaped electrodes 202 to 205, respectively. When the upper transparent conductive film 201 of FIG. 7B is used, the AD converters 211 to 214 of FIG. 7A are connected to the contact electrodes 202a to 205a, respectively. The control terminals 215 to 220 are connected to the switches 226 to 231, respectively. Each of the switches 226 to 231 is a transistor, for example.

The lower transparent conductive film 221 functions as the first resistance film, and the upper transparent conductive film 201 functions as the second resistance film. When the contact electrode 222 and 223 (or the contact electrode 224 and 225) function as the first electrodes, the rod-shaped electrodes 202 and 203 function as the second electrodes, and the AD converters 213 and 214 function as the first detector. When the contact electrode 222 and 223 (or the contact electrode 224 and 225) function as the first electrodes, the contact electrode 222 and 224 (or the contact electrode 223 and 225) function as the third electrodes, the rod-shaped electrodes 204 and 205 function as the fourth electrodes, and the AD converters 211 and 212 function as the second detector.

When the contact electrode 222 and 224 (or the contact electrode 223 and 225) function as the first electrodes, the rod-shaped electrodes 204 and 205 function as the second electrodes, and the AD converters 211 and 212 function as the first detector. When the contact electrode 222 and 224 (or the contact electrode 223 and 225) function as the first electrodes, the contact electrode 222 and 223 (or the contact electrode 224 and 225) function as the third electrodes, the rod-shaped electrodes 202 and 203 function as the fourth electrodes, and the AD converters 213 and 214 function as the second detector. The controller 210 functions as the calculator.

Figure 8A:
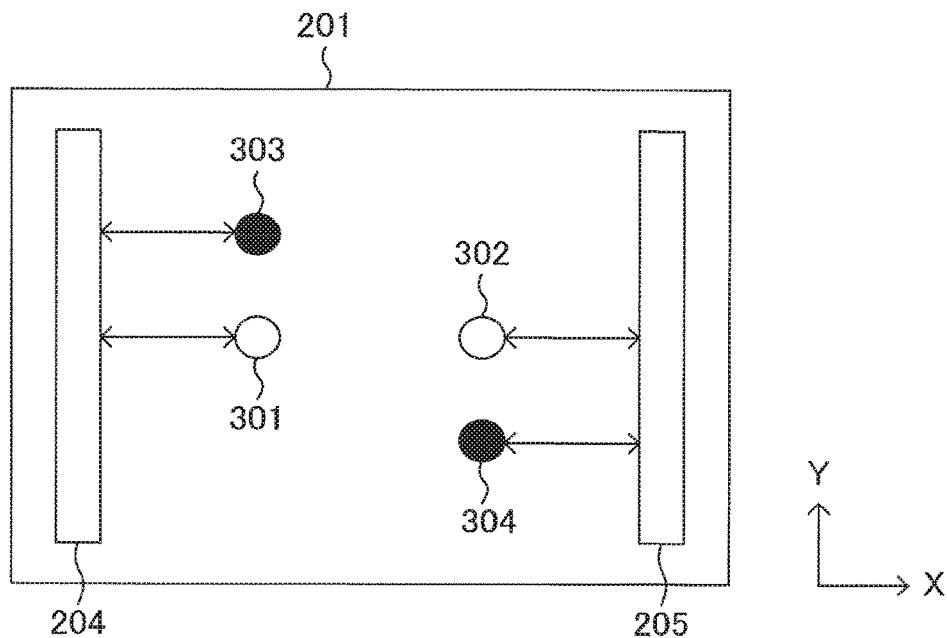
FIG. 8A is a diagram illustrating a state where two-point input is performed on an upper transparent conductive film on which rod-shaped electrodes are provided.
Figure 8B:
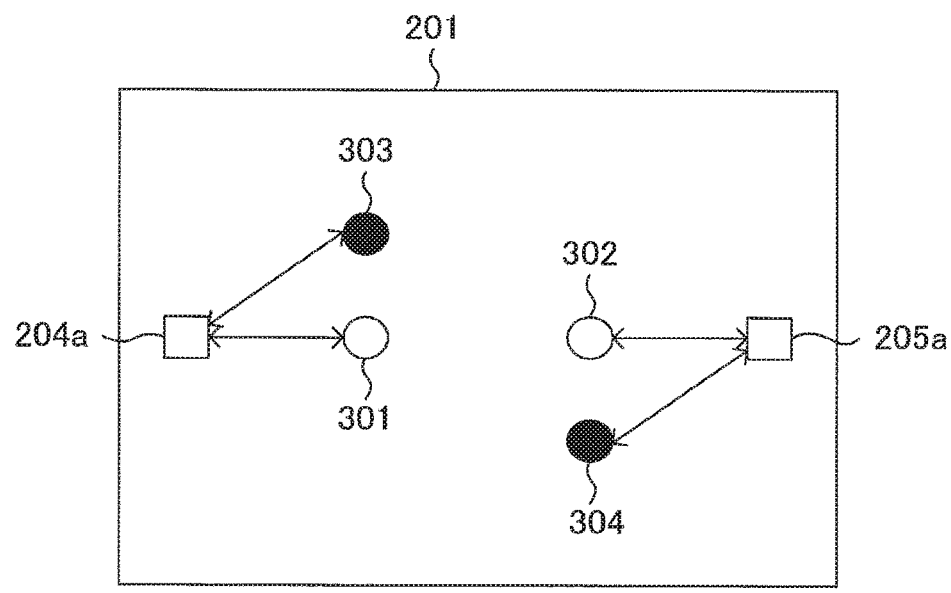
FIG. 8B is a diagram illustrating a state where two-point input is performed on the upper transparent conductive film on which contact electrodes are provided.

FIG. 8A is a diagram illustrating a state where two-point input is performed on the upper transparent conductive film on which the rod-shaped electrodes are provided. FIG. 8B is a diagram illustrating a state where two-point input is performed on the upper transparent conductive film on which the contact electrodes are provided. In FIG. 8A, the rod-shaped electrodes 202 and 203 on the upper transparent conductive film 201 are omitted. In FIG. 8B, the rod-shaped electrodes 202a and 203a on the upper transparent conductive film 201 are omitted.

Two points 301 and 302 of FIGS. 8A and 8B indicate two input positions parallel to the X-direction (i.e., two input positions perpendicular to the Y-direction). Two points 303 and 304 of FIGS. 8A and 8B indicate two input positions arranged diagonally to the X-direction and the Y-direction. That is, a straight line coupling two points 303 and 304 intersects the X-direction and the Y-direction diagonally.

In FIG. 8A, when the two points 303 and 304 arranged diagonally to the X-direction and the Y-direction are input, distances from the two input points to the respective rod-shaped electrodes do not change from corresponding distances when the two points 301 and 302 parallel to the X-direction are input. That is, the distance from the point 303 to the rod-shaped electrode 204 is the same as the distance from the point 301 to the rod-shaped electrode 204, and the distance from the point 304 to the rod-shaped electrode 205 is the same as the distance from the point 302 to the rod-shaped electrode 205.

In FIG. 8B, when the two points 303 and 304 arranged diagonally to the X-direction and the Y-direction are input, distances from the two input points to the respective contact electrodes change from corresponding distances when the two points 301 and 302 parallel to the X-direction are input. That is, the distance from the point 303 to the contact electrode 204a is longer than the distance from the point 301 to the contact electrode 204a, and the distance from the point 304 to the contact electrode 205a is longer than the distance from the point 302 to the contact electrode 205a.

Therefore, when the two points in a diagonal direction are input, the distances from the two input positions to the respective contact electrodes are reflected to the results of measurement (i.e., the detection voltages), which causes deviations from two accurate positions. For this reason, it is preferable that the electrodes on the upper transparent conductive film 201 are four rod-shaped electrodes. Alternatively, it is preferable that two electrodes in a direction where high precision is required are rod-shaped electrodes.

Figure 9:
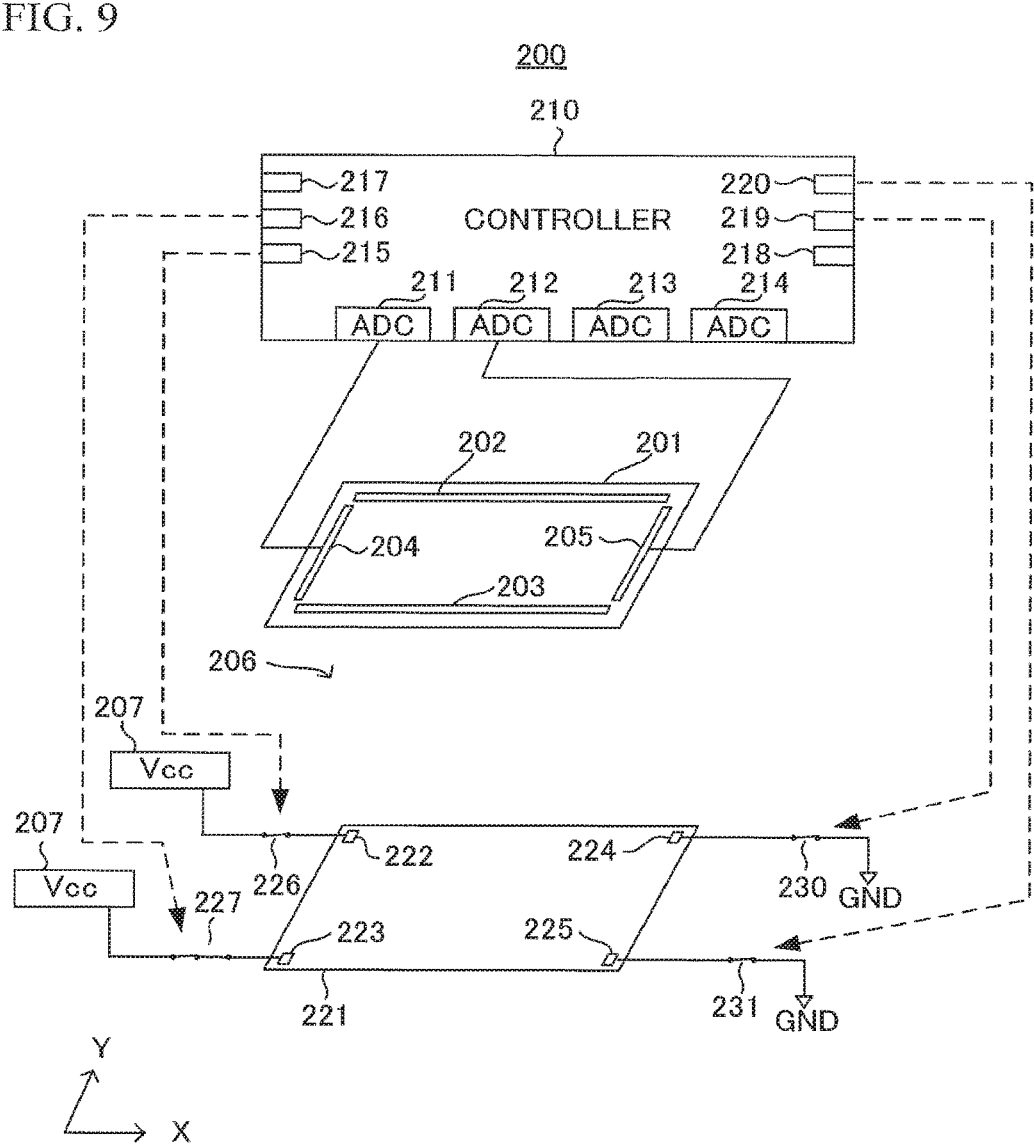
FIG. 9 is a diagram illustrating a circuit state of the touch panel device at the time of the detection of at least one input coordinate in the X-direction.

FIG. 9 is a diagram illustrating a circuit state of the touch panel device at the time of the detection of at least one input coordinate in the X-direction. FIG. 10 is a diagram illustrating an ON/OFF state of each switch and a use/unused state of each AD converter at the time of the detection of at least one input coordinate in the X-direction.

At the time of the detection of at least one input coordinate in the X-direction, the controller 210 outputs the on signals from the control terminals 215, 216, 219 and 220 to turn on the switches 226, 227, 230 and 231. The controller 210 outputs the off signals from the control terminals 217 and 218 to turn off the switches 228 and 229. Moreover, the controller 210 sets the AD converters 211 and 212 into the use state, and sets the AD converters 213 and 214 into the unused state. Thereby, the electric potential distribution is formed in the X-direction of the lower transparent conductive film 221, and hence the AD converters 211 and 213 connected to the rod-shaped electrodes 204 and 205 on the upper transparent conductive film 201 acquire voltages in accordance with at least one input position.

In the case of one-point input, the detection voltages of the AD converters 211 and 212 are equal to each other. Therefore, the controller 210 calculates an input coordinate in the X-direction by multiplying a ratio of the detection voltage to a potential difference between the contact electrodes 222 and 224 (or the contact electrodes 223 and 225) by a distance between the contact electrodes 222 and 224 (or the contact electrodes 223 and 225). That is, the input coordinate in the X-direction is expressed by a formula (10). At this time, the potential difference and the distance between the contact electrodes 222 and 224 (or the contact electrodes 223 and 225) are set to the controller 210 beforehand.

$$X \text{ coordinate (Distance from electrode 224 or 225)} = \frac{\text{Detection voltage}}{\text{Potential difference between electrodes 222 and 224}} \times \text{Distance between electrodes 222 and 224 (or electrodes 223 and 225)} \quad (10)$$

In the case of two-point input (i.e., in the case where the input positions are two points separated from each other in the X-direction), the detection voltage of the AD converter 211 is larger than that of the AD converter 212. At this time, the controller 210 calculates a distance between the two input positions in the X-direction, based on the above-mentioned formula (6), the detection voltage of the AD converter 211 and the detection voltage of the AD converter 212. Moreover, the controller 210 calculates an intermediate coordinate of the two input positions in the X-direction, based on the above-mentioned formula (7), the detection voltage of the AD converter 211 and the detection voltage of the AD converter 212. In this case, the electrodes 9 and 10 of the formulas (6) and (7) correspond to the contact electrodes 222 and 224 (or the contact electrodes 223 and 225), and the input points A and B correspond to the two input positions. Then, the controller 210 calculates coordinates of the two input positions in the X-direction by adding and reducing a half of the distance calculated with the formula (6) to/from the intermediate coordinate calculated with the formula (7).

Figure 11:
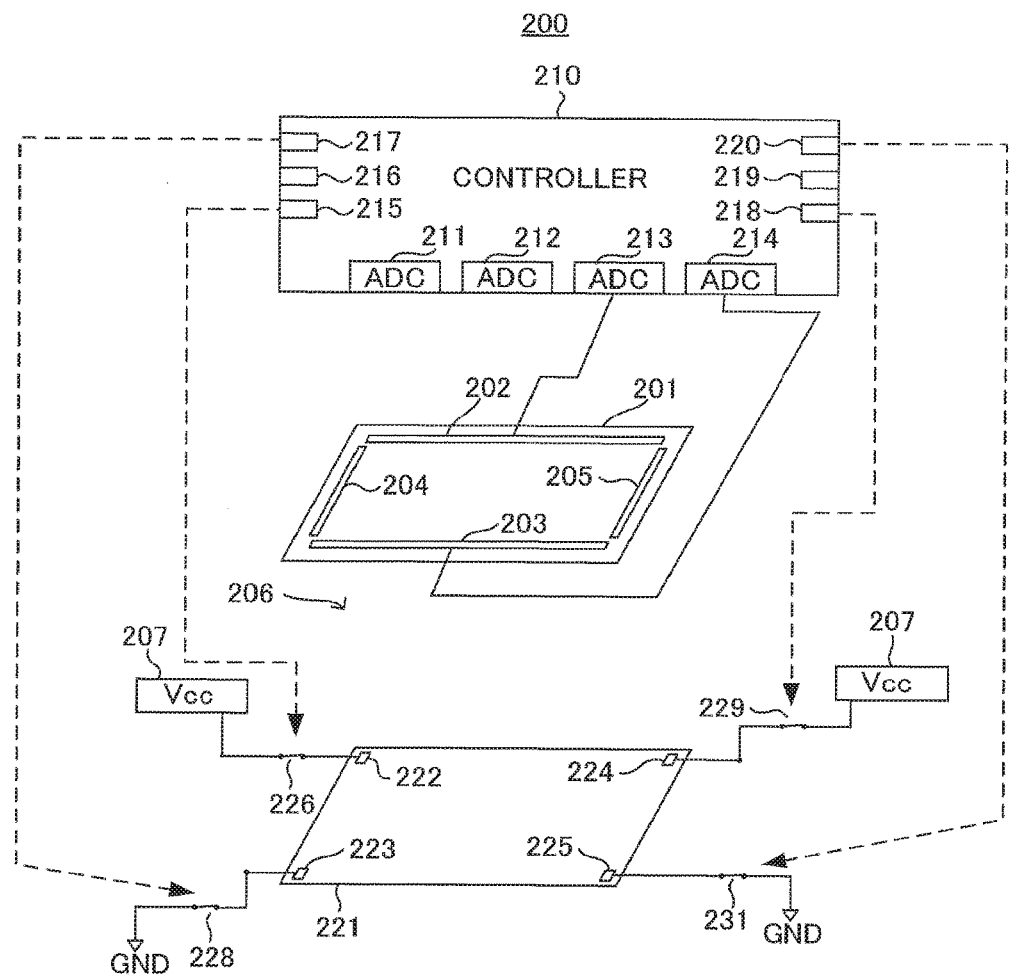
FIG. 11 is a diagram illustrating a circuit state of the touch panel device at the time of the detection of at least one input coordinate in the Y-direction.

FIG. 11 is a diagram illustrating a circuit state of the touch panel device at the time of the detection of at least one input coordinate in the Y-direction. FIG. 12 is a diagram illustrating an ON/OFF state of each switch and a use/unused state of each AD converter at the time of the detection of at least one input coordinate in the Y-direction.

At the time of the detection of at least one input coordinate in the Y-direction, the controller 210 outputs the on signals from the control terminals 215, 217, 218 and 220 to turn on the switches 226, 228, 229 and 231. The controller 210 outputs the off signals from the control terminals 216 and 219 to turn off the switches 227 and 230. Moreover, the controller 210 sets the AD converters 211 and 212 into the unused state, and sets the AD converters 213 and 214 into the use state. Thereby, the electric potential distribution is formed in the Y-direction of the lower transparent conductive film 221, and hence the AD converters 213 and 214 connected to the rod-shaped electrodes 202 and 203 on the upper transparent conductive film 201 acquire voltages in accordance with at least one input position.

In the case of one-point input, the detection voltages of the AD converters 213 and 214 are equal to each other. Therefore, the controller 210 calculates an input coordinate in the Y-direction by multiplying a ratio of the detection voltage to a potential difference between the contact electrodes 222 and 223 (or the contact electrodes 224 and 225) by a distance between the contact electrodes 222 and 223 (or the contact electrodes 224 and 225). That is, the input coordinate in the Y-direction is expressed by a formula (11). At this time, the potential difference and the distance between the contact electrodes 222 and 223 (or the contact electrodes 224 and 225) are set to the controller 210 beforehand.

$$Y \text{ coordinate (Distance from electrode 223 or 225)} = \frac{\text{Detection voltage}}{\text{Potential difference between electrodes 222 and 223}} \times \text{Distance between electrodes 222 and 223 (or electrodes 224 and 225)} \quad (11)$$

In the case of two-point input (i.e., in the case where the input positions are two points separated from each other in the Y-direction), the detection voltage of the AD converter 213 is larger than that of the AD converter 214. At this time, the controller 210 calculates a distance between the two input positions in the Y-direction, based on the above-mentioned formula (6), the detection voltage of the AD converter 213 and the detection voltage of the AD converter 214. Moreover, the controller 210 calculates an intermediate coordinate of the two input positions in the Y-direction, based on the above-mentioned formula (7), the detection voltage of the AD converter 213 and the detection voltage of the AD converter 214. In this case, the electrodes 9 and 10 of the formulas (6) and (7) correspond to the contact electrodes 222 and 223 (or the contact electrodes 224 and 225), and the input points A and B correspond to the two input positions. Then, the controller 210 calculates coordinates of the two input positions in the Y-direction by adding and reducing a half of the distance calculated with the formula (6) to/from the intermediate coordinate calculated with the formula (7).

As described above, according to the second embodiment, the touch panel device 200 includes: a pair of contact electrodes 222 and 224 (or contact electrodes 223 and 225) that is arranged on the lower transparent conductive film 221, and applies a voltage to the lower transparent conductive film 221; a pair of rod-shaped electrodes 204 and 205 that is arranged on both ends of the upper transparent conductive film 201 in the same direction as the voltage application direction (e.g. the X-direction); the AD converters 211 and 212 that detect voltages applied to the rod-shaped electrodes 204 and 205, respectively, when the upper transparent conductive film 201 contacts the lower transparent conductive film 221 at two points; and the controller 210 that calculates coordinates of the two points in the voltage application direction based on the respective voltages detected by the AD converters 211 and 212. Alternatively, the touch panel device 200 includes: a pair of contact electrodes 222 and 223 (or contact electrodes 224 and 225) that is arranged on the lower transparent conductive film 221, and applies a voltage to the lower transparent conductive film 221; a pair of rod-shaped electrodes 202 and 203 that is arranged on both ends of the upper transparent conductive film 201 in the same direction as the voltage application direction (e.g. the Y-direction); the AD converters 213 and 214 that detect voltages applied to the rod-shaped electrodes 202 and 203, respectively, when the upper transparent conductive film 201 contacts the lower transparent conductive film 221 at two points; and the controller 210 that calculates coordinates of the two points in the voltage application direction based on the respective voltages detected by the AD converters 213 and 214.

Therefore, the touch panel device 200 can measure X-coordinates and Y-coordinates of the two touched points at a time. According to the present embodiment, the X-coordinates of the two points are measured at a time, and then the voltage application direction is switched from the X-direction to the Y-direction. Thereby, the Y-coordinates of the two points can be measured at a time. Alternatively, the Y-coordinates of the two points are measured at a time, and then the voltage application direction is switched from the Y-direction to the X-direction. Thereby, the X-coordinates of the two points can be measured at a time. Therefore, it is possible to reduce a measuring time of the coordinates of the two points, compared with a conventional touch panel device. Moreover, the touch panel device 200 does not have to separately include a panel driving circuit for detecting the intermediate point between the two touched points, and a panel driving circuit for detecting the positions of the two touched points. Therefore, it is possible to simplify a panel driving circuit (i.e., the switches 226 to 231 and the control terminals 215 to 220 for switching the voltage application direction), compared with the conventional touch panel device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel device comprising:
a first resistance film;
a second resistance film opposed to the first resistance film;
a pair of first electrodes that applies a first voltage to the first resistance film in a first direction from one of the pair of the first electrodes to another of the pair of the first electrodes, the one of the pair of the first electrodes being arranged at a first end of the first resistance film in the first direction, the another of the pair of the first electrodes being arranged at a second end of the first resistance film in the first direction;
a pair of second electrodes, one of the pair of the second electrodes being arranged at a first end of the second resistance film in the first direction, another of the pair of the second electrodes being arranged at a second end of the second resistance film in the first direction;
a pair of first detectors, one of the pair of first detectors being connected to the one of the pair of the second electrodes and detecting a voltage at the one of the pair of the second electrodes, another of the pair of first detectors being connected to the another of the pair of the second electrodes and detecting a voltage at the another of the pair of the second electrodes; and
a calculator that calculates a distance between two points touched at the same time from a difference between the detected voltage at the one of the pair of the second electrodes and the detected voltage at the another of the pair of the second electrodes, calculates an intermediate position of the two points from an average value of the detected voltage at the one of the pair of the second electrodes and the detected voltage at the another of the pair of the second electrodes, and calculates a coordinate of a first one of the two points in the first direction by adding a half of the distance between the two points to the intermediate position of the two points, and calculates a coordinate of a second one of the two points in the first direction by subtracting the half of the distance between the two points from the intermediate position of the two points.

2. The touch panel device as claimed in claim 1, wherein when the touch panel device is a five-wire type touch panel device or a seven-wire type touch panel device, the touch panel device further comprises:
a pair of third electrodes that is arranged on the first resistance film, and applies a second voltage to the first resistance film;
a pair of fourth electrodes that is arranged on both ends of the second resistance film in the same direction as an application direction of the second voltage; and
a second detector that is connected to the pair of the fourth electrodes, and detects voltages at the fourth electrodes, respectively;
wherein the calculator that calculates coordinates of the two points in the application direction of the second voltage based on the respective voltages detected by the second detector,
either of the first electrodes and the third electrodes are arranged parallel to a first direction, and the others are arranged parallel to a second direction perpendicular to the first direction, and
at least either of the first electrodes and the third electrodes are rod-shaped electrodes, and the second electrodes and the fourth electrodes are contact electrodes.

3. The touch panel device as claimed in claim 1, wherein the second electrodes are contact electrodes.

4. The touch panel device as claimed in claim 1, wherein an analog-to-digital (A/D) converter functions as the first detector.

5. A touch panel device comprising:
a first resistance film;
a second resistance film opposed to the first resistance film;
a pair of first electrodes that is arranged on the first resistance film, and applies a first voltage to the first resistance film;
a pair of second electrodes that is arranged on both ends of the second resistance film in the same direction as an application direction of the first voltage;
a first detector that is connected to the pair of the second electrodes, and detects voltages at the second electrodes, respectively; and a calculator that calculates coordinates of two points in the application direction of the first voltage based on the respective voltages detected by the first detector, wherein when the touch panel device is a four-wire type touch panel device, the touch panel device further comprises:

a pair of third electrodes that is arranged on the second resistance film, and applies a second voltage to the second resistance film;

a pair of fourth electrodes that is arranged on both ends of the first resistance film in the same direction as an application direction of the second voltage; and a second detector that is connected to the pair of the fourth electrodes, and detects voltages at the fourth electrodes, respectively;

wherein the calculator that calculates coordinates of the two points in the application direction of the second voltage based on the respective voltages detected by the second detector, either of the first electrodes and the third electrodes are arranged parallel to a first direction, and the others are arranged parallel to a second direction perpendicular to the first direction, and the second electrodes and the fourth electrodes are contact electrodes.

6. A touch panel device comprising:

a first resistance film;

a second resistance film opposed to the first resistance film;

a pair of first electrodes that is arranged on the first resistance film so as to face in a first direction from each other, and applies a first voltage to the first resistance film;

a pair of second electrodes that is arranged on the second resistance film so as to face in the first direction from each other;

a pair of first detectors that is connected to the pair of the second electrodes, and detects voltages at the second electrodes, respectively;

a pair of third electrodes that is arranged on the second resistance film so as to face in a second direction perpendicular to the first direction from each other, and applies a second voltage to the second resistance film;

a pair of fourth electrodes that is arranged on the first resistance film so as to face in the second direction from each other;

a pair of second electrodes that is connected to the pair of the fourth electrodes, and detects voltages at the fourth electrodes, respectively; and a calculator that calculates coordinates of two points touched at the same time in the first direction based on the respective voltages detected by the pair of the first detectors, and calculates coordinates of two points touched at the same time in the second direction based on the respective voltages detected by the pair of the second detectors.

7. The touch panel device as claimed in claim 6, wherein a length of each of the second electrodes is shorter than a length of each of the first electrodes, respectively.

* * * * *